United States Patent
Lin

(12) 
(10) Patent No.: US 6,216,909 B1
(45) Date of Patent: Apr. 17, 2001

(54) STAINLESS STEEL THERMAL CUP WITH HANDLE

(76) Inventor: Shin Shuoh Lin, 5th Floor, No. 755, Ming Tzu E. Road, Taipei (TW)

( * ) Notice: Subject to any disclaimer, the term of this patent is extended or adjusted under 35 U.S.C. 154(b) by 0 days.

(21) Appl. No.: 09/488,051

(22) Filed: Jan. 20, 2000

(51) Int. Cl.$^7$ .................................................. B65D 25/20
(52) U.S. Cl. ........................... 220/739; 220/756; 220/758
(58) Field of Search .................................... 220/737, 758, 220/759, 756, 739

(56) References Cited

U.S. PATENT DOCUMENTS

| | | | |
|---|---|---|---|
| 4,088,250 | * 5/1978 | Schaefer | 220/739 |
| 5,613,720 | * 3/1997 | Shaddy | 220/739 |
| 5,655,805 | * 8/1997 | Shaddy | 220/739 |
| 5,765,716 | * 6/1998 | Cai et al. | 220/739 |
| 5,799,811 | * 9/1998 | Bruckner et al. | 220/758 |
| 5,918,761 | * 7/1999 | Wissinger | 220/758 |
| 5,968,618 | * 10/1999 | Miller | 220/758 |

\* cited by examiner

Primary Examiner—Joseph M. Moy
(74) Attorney, Agent, or Firm—Dougherty & Troxell

(57) ABSTRACT

A stainless steel thermal cup with handle includes a stainless steel cup body, a cover, and a plastic jacket. The cup body has a tightly sealed and heat insulating cup wall formed by double-layer stainless steel and confining a receiving space adapted to receive a hot or cold liquid. The cover is adapted for closing an open top of the cup body to prevent spilling of the liquid inside the cup body, loss of heat of the liquid inside the cup body to the outside, and entry of dust into the cup body. The jacket has a handle on one side and is fitted around the cup body distal to the opening of the cup body in a suitable position. The part of the cup body below the jacket may be painted to enhance the appearance of the cup while the part above the jacket is left unpainted to prevent contact between the user's lips and the paint, which may be toxic. Besides, the jacket may, when the cup is inadvertently tipped over or hits against other objects or a table surface, protect the cup body from damage and prevent scratching of the table surface.

2 Claims, 4 Drawing Sheets

STAINLESS STEEL THERMAL CUP WITH HANDLE

BACKGROUND OF THE INVENTION (a) Field of the Invention

The present invention relates to a stainless steel thermal cup with handle, more particularly to a thermal cup that is provided with a jacket having a handle to facilitate holding and serving as a partition, in which the part of a cup body below the jacket may be painted to enhance the appearance of the thermal cup, while the part above the jacket may be left unpainted to ensure that the user's lips will not contact the paint, which may be toxic. Due to the arrangement of the jacket, an opening portion of the cup body may be processed to ensure easy cleaning. In addition, when the thermal cup is inadvertently tipped over on a table surface or hits against other objects, the jacket can protect the cup body from being damaged and will not scratch the table surface.

(b) Description of the Prior Art

Thermal cups are quite popular today as they can be used to store cold and hot drinks for a relatively long period of time compared to ordinary cups. Thermal cups are generally formed from stainless steel. However, it is not easy to install a handle on the outer periphery of a stainless steel thermal cup. In order to save costs, labor and time in mounting a handle to the stainless steel thermal cup, heat insulation plastic rings or tapes are provided around the cups to facilitate gripping. However, the effect is not very good. Besides, if the liquid contained in the thermal cup is too much or if the thermal cup is used by a child, the thermal cup may slip. In addition, if the outer wall of the thermal cup is painted, the paint, which may be toxic, may contact the user's lips during drinking. To prevent possible intoxication due to contact with the paint on the outside of the thermal cup at the opening, a plastic or rubber ring is generally provided at the opening of the thermal cup. However, the plastic or rubber ring is difficult to clean up and is not nice to touch with the lips. Furthermore, if the thermal cup is inadvertently tipped over on a table surface or hits against other objects, it may be damaged or scratch the table surface. Lastly, as conventional thermal cups are generally cylindrical in shape, they may be easily tipped over and roll on the surface, which may damage the outer appearance thereof.

SUMMARY OF THE INVENTION

A primary object of the present invention is to provide a stainless steel thermal cup having a handle, in which a jacket is fitted over a cup body distal to an opening of the cup body in a suitable position. The jacket has a handle on one side to facilitate, and is adapted to protect the cup body from damage or from scratching a table surface even if the thermal cup is tipped over or hits against other objects.

Another object of the present invention is to provide a stainless steel thermal cup with a handle, in which the part below the jacket is painted to enhance the appearance of the thermal cup, while the part above the jacket is left unpainted to prevent contact between the user's lips and the paint, which may be toxic. There is no need to provide a plastic or rubber ring at the opening of the thermal which is not nice to touch with the lips during drinking or which is not easy to clean.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
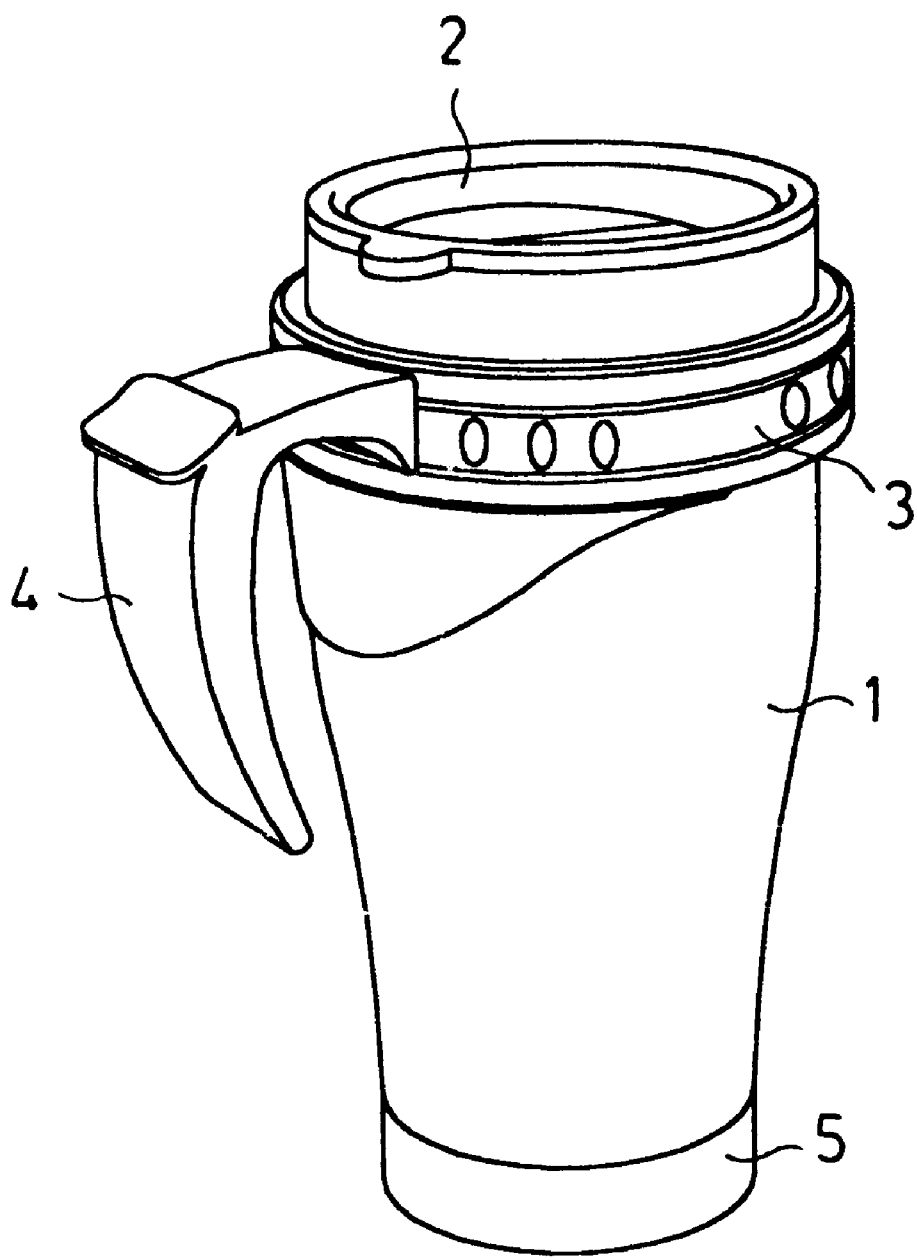
FIG. 1 is a perspective view of a preferred embodiment of the present invention.
Figure 2:
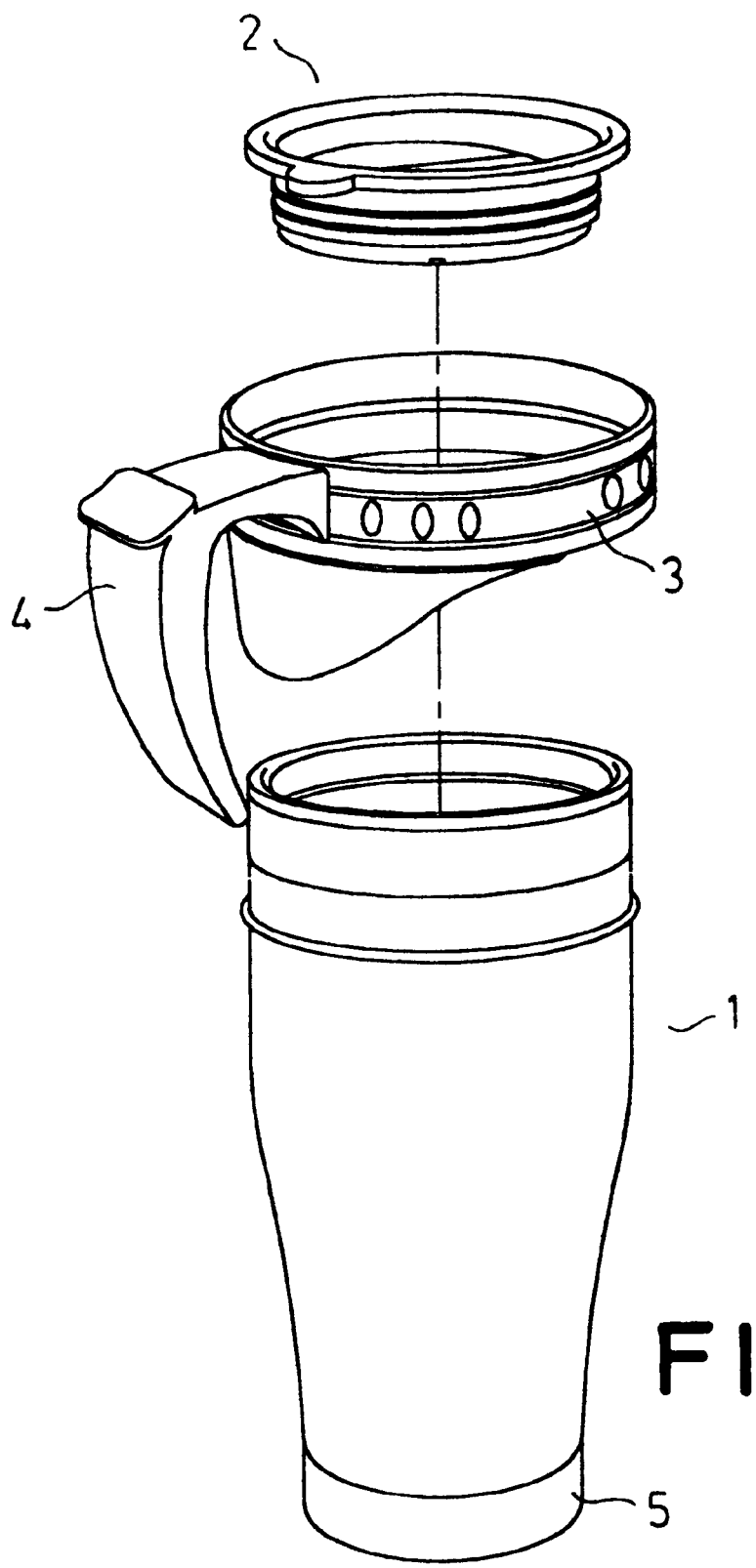
FIG. 2 is an exploded perspective view of the preferred embodiment.
Figure 3:
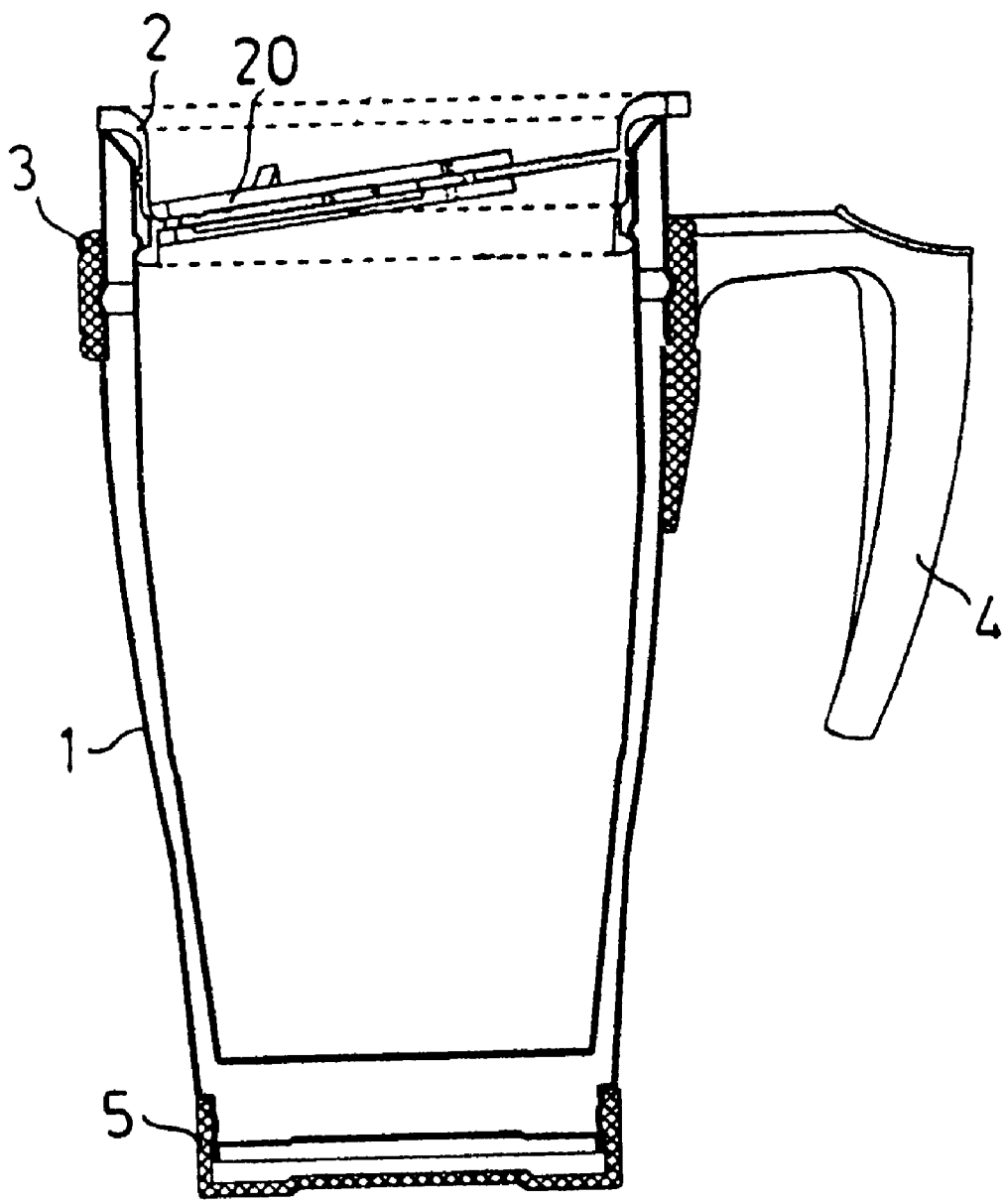
FIG. 3 is a sectional view of the preferred embodiment.
Figure 4:
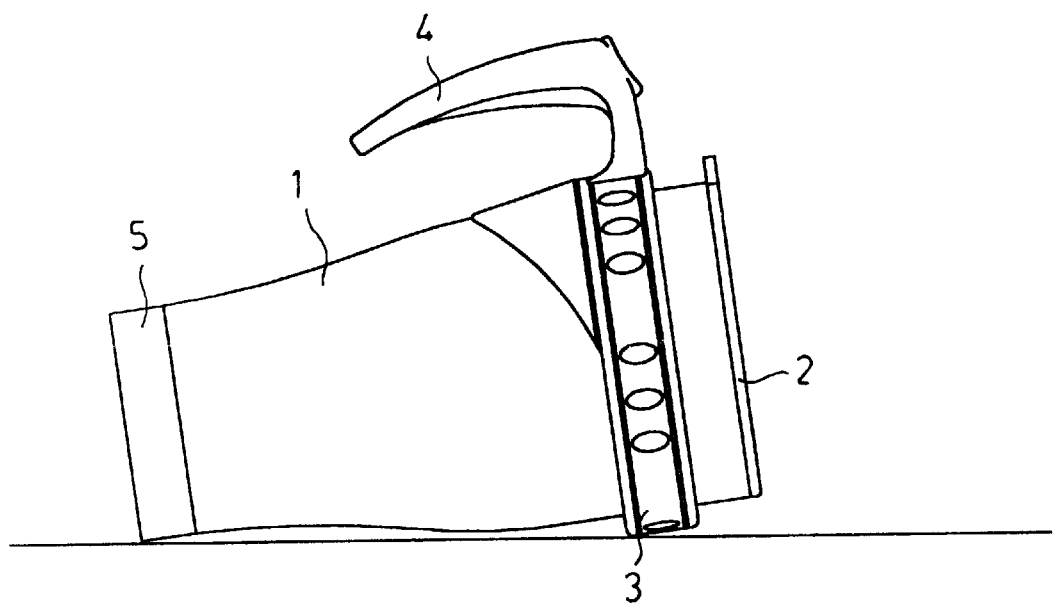
FIG. 4 is a side view illustrating a thermal cup of the preferred embodiment in a tipped-over state.

With reference to FIGS. 1 to 4, the present invention comprises a cup body 1 of stainless steel, a cover 2, and a jacket 3 of plastic. The cup body 1 is formed by double-layer of stainless steel using argon arc welding to constitute a firm, tightly sealed heat insulated cup walls confining a receiving space to receive a hot or cold liquid. A top end of the cup body 1 has an opening the inner edge of which is formed such that, when the cover 2 is fitted inside the opening of the cup body 1, the cover 2 can be fittingly squeezed in position. The edge of the cup of the present invention is even and smooth so that it is nice to touch with the lips during drinking. Also, it is convenient to pour liquid into the cup, and the cover 2 will not slip even if the cup is tipped over. The cover 2 is provided with a slide piece 20 at a top portion thereof. The slide piece 20 is openable to allow the user to drink directly from the cup without having to remove the cover 2, and is closable to prevent leakage of the liquid inside the cup body 1 and prevent loss of heat to the outside and entry of dust. The jacket 3 is provided with a handle 4 at one end thereof. The jacket 3 is fitted over the top end portion of the cup body 1 in a suitable position. The jacket 3 may be adapted to serve as a partition. The part of the cup body 1 above the jacket 3 may be polished and processed to meet hygienic requirements and to be acid-resistant, base-resistant, non-toxic, odorless, and easy-to-clean, whereas the part below the jacket 3 may be polished and painted to provide more choices for consumers. If desired, a base 5 of plastic may be fitted to the bottom portion of the cup body 1 to serve as a pad.

In actual use, no mater the size of the cup body 1, no matter how much of a liquid is contained in the cup body 1, even a child user can hold the cup properly by means of the handle 4 on one side. Furthermore, the jacket 3 and the base 5 can be coupled to the cup body 1 by pressing in a simple manner to reduce costs, labor and time. Furthermore, the jacket 3 may serve as a partition, and the part of the cup body 1 below the jacket 3 may be painted to enhance the appearance of the cup. As only the lower portion of the cup body 1 is painted, the user's contacting the upper portion of the cup body 1 during drinking will not pose any danger of toxicity. In addition, there is no need to provide a plastic ring at the opening of the cup body 1, which is not nice to the lips and is not easy to clean. Moreover, when the cup is tipped over or hit against other objects, the jacket 3 may provide certain support and protection to prevent the cup from damage. The base 5 separates the bottom portion of the cup body 1 from the surface on which the cup is placed.

Although the present invention has been illustrated and described with reference to the preferred embodiment thereof, it should be understood that it is in no way limited to the details of such embodiment but is capable of numerous modifications within the scope of the appended claims.

What is claimed is:

1. A stainless steel thermal cup with handle, comprising:

a cup body of stainless steel and having a tightly sealed and heat insulating cup wall formed by double-layer stainless steel and confining a receiving space adapted to receive a hot or cold liquid, a diameter of an inner edge of an open top of the cup body is greater than a diameter of a bottom portion of the cup body;

a cover having a slide piece for closing the open top of the cup body to prevent spilling of the liquid from the cup body, loss of heat of the liquid inside the cup body to the outside, and entry of dust into the cup body;

a plastic base fitted to the bottom portion of the cup body, and, a jacket of plastic with a protective support having a handle on one side fitted around the cup body distal to the opening of the cup body, the jacket extending outwardly from the cup body and located such that the jacket and the plastic base support the cup when the cup is tipped over onto a flat surface so as to prevent the cup body from contacting the surface.

2. A stainless steel thermal cup as defined in claim 1, wherein the part of the cup body below the jacket is painted.

* * * * *